March 30, 1926.

A. L. LANE

SCOOTER

Filed August 3, 1925

1,578,836

Witnesses
Chas. G. Barnett

Inventor
Allie L. Lane
By Jeff and Jeff
Attorneys.

Patented Mar. 30, 1926.

1,578,836

UNITED STATES PATENT OFFICE.

ALLIE L. LANE, OF SPARLAND, ILLINOIS.

SCOOTER.

Application filed August 3, 1925. Serial No. 47,828.

*To all whom it may concern:*

Be it known that I, ALLIE L. LANE, a citizen of the United States, residing at Sparland, in the county of Marshall and State of Illinois, have invented a new and useful Improvement in Scooters, of which the following is a specification.

My invention relates to scooters, comprising a foot board supported on the two wheels, a steering member and a pedal operated drive mechanism for the rear wheel.

The object of my invention is in the provision of drive mechanism for a scooter, comprising a double disk drive wheel, a clutch member associated therewith and a cable drive from the pedal member.

Referring to the drawings.

Figure 1:
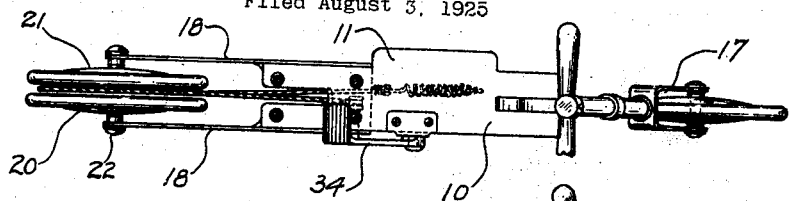
Fig. 1 is a top view of my scooter.
Figure 2:
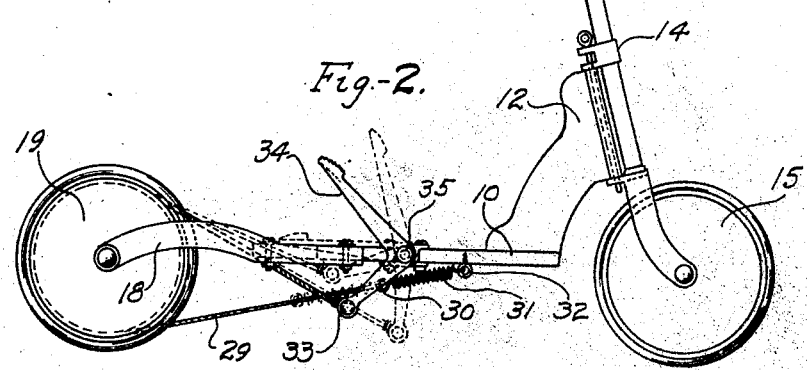
Fig. 2 is a side view of the same.
Figure 3:
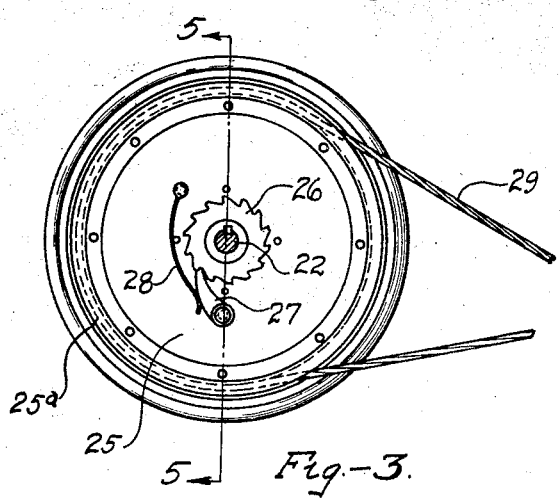
Fig. 3 is an enlarged detail showing the particular driving mechanism for the rear wheel.
Figure 4:
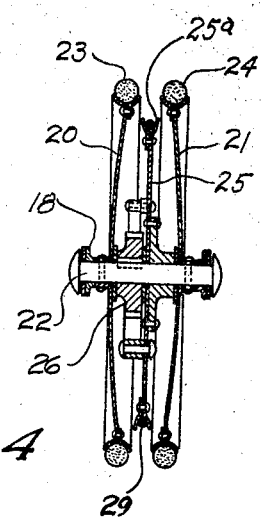
Fig. 4 is a section on the line 5—5 of Fig. 3.

In the drawings, 10 refers to the foot board, the same having a projecting side portion 11, upon which one foot of the operator is placed. The forward portion of the foot board is fashioned in the manner shown at 12, to permit pivoted attachment with the supporting member 14, which comprises a connecting means between the front wheel 15 and the steering mechanism 16. The supporting member 14 is bifurcated as at 17 to provide proper attachment means for the front wheel. The rear end of the foot board is raised slightly as shown at 18, and bifurcated in a manner to provide suitable connection with the rear or drive wheel 19, as well as to permit efficient operation of the cable drive mechanism, later to be described. The rear or drive wheel, generally referred to as 19, as a matter of fact is made up of two disks 20 and 21, fixedly attached to the axle 22, suitably supported in the bifurcated portion 18. The disks, which are made of steel, have rubber tires 23 and 24 respectively upon their peripheries, and said disks are located in a manner to leave an opening of substantially one inch between their peripheries. A plate 25 is rotatably mounted upon the axle 22 at a point intermediate the disks, said plate having a clutching relationship with a gear wheel 26, fixedly attached to the axle, said clutching arrangement being effected through a formal lug member 27, spring tensioned by means of the flat spring 28. The plate 25 has its outer edge 25ª fashioned in V-shaped manner to provide a frictional engagement guideway for the drive cable 29, which has one of its ends attached as at 30 to a coil spring 31, said coil spring having its opposed end fixed as at 32 to the frame or foot member 10. The opposite end of the drive cable is attached, as at 33 to the lower end of a bell crank lever or pedal portion 34, the same being pivoted at 35 to the foot board.

The operation of the scooter is similar in all respects to the conventional scooter, except as to the drive mechanism, which is similarly controlled by the pumping action of the operator applied to the foot pedal. In the present instance, the drive cable 29 is leather coated, to provide a more efficient frictional contact with the V-shaped edge of the plate and upon depression of the foot pedal 34, a forward movement of the plate is effected through the frictional engagement of the cable, whereupon the lug member 27 operates to move the gear portion 26 and hence move the axle to facilitate movement of the scooter in a forward direction. Upon the complete depression of the foot pedal, and consequently the completion of forward movement of the scooter by direct pressure, a release of the pedal permits contraction of the coil spring 31 to effect a return or backward movement of the plate member to its normal position, with a consequent sliding or backward movement of pawl over the teeth of the gear 26. This contraction of the spring and consequent movement of the plate member as described, will naturally return the foot pedal to its normal position, and in a position to again be depressed by the operator with the result that constant pedal movement will effect forward movement of the scooter with a gradual increase of speed.

What I claim is:

In a device of the class described, a frame, a steering wheel at the front and a driving wheel at the rear, comprising two opposed disk members and an axle support therefor, a pedal pivoted to the frame portion and a driving means between the pedal and rear wheel comprising a plate member rotatably attached to the axle at a point between the disk members, a friction cable member engaging throughout a considerable portion thereof the outer edge of the plate member, said cable being attached at one end to the frame portion and at the other end to the pedal member, a coil spring for tensioning said cable member and a clutching mechanism between the plate member and the axle permitting forward movement of the device by depression of the pedal member.

In testimony whereof I have affixed my signature.

ALLIE L. LANE.